W. H. GUTHRIE.
Screw-Driver.
No. 222,781. Patented Dec. 23, 1879.
Fig. 1. Fig. 2.
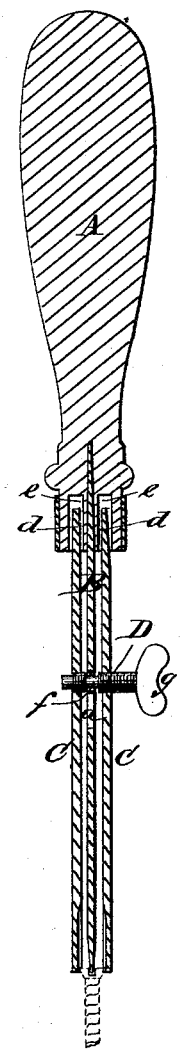
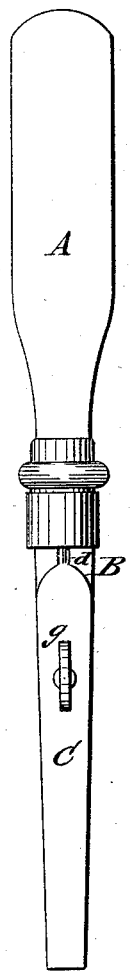
Fig. 3.
WITNESSES:
Achilles Schehl.
C. Sedgwick
INVENTOR:
W. H. Guthrie
BY Munn & Co.
ATTORNEYS.

UNITED STATES PATENT OFFICE.

WARREN H. GUTHRIE, OF FLORENCE, NEW JERSEY.

IMPROVEMENT IN SCREW-DRIVERS.

Specification forming part of Letters Patent No. 222,781, dated December 23, 1879; application filed May 14, 1879.

*To all whom it may concern:*

Be it known that I, WARREN H. GUTHRIE, of Florence, in the county of Burlington and State of New Jersey, have invented a new and Improved Screw-Driver, of which the following is a specification.

The object of this invention is to prevent the screw-driver from slipping out of the slot in the head of the screw.

It consists in placing a jaw on each side of the blade, and connecting them by a right and left thumb-screw passed through a slot in the blade, whereby the ends of the said jaws can be moved to and from the blade, and thus adapted to clasp screw-heads of various sizes.

In the accompanying drawings, Figure 1 is a longitudinal section of the screw-driver provided with my improvements. Fig. 2 is a side view of the same; and Fig. 3 represents the slot in the blade.

Similar letters of reference indicate corresponding parts.

Referring to the drawings, A is the handle of the screw-driver. B is the blade, through which is a slot, $a$, at the upper end whereof is an enlarged hole, $b$. C C are the jaws, having pointed ends $d\ d$, which are inserted in slots $e\ e$ in the handle, on either side of the inserted part of the blade, so that they lie against the blade and extend down to the end thereof, as more clearly shown in Fig. 1.

Through the jaws are made holes in line with the slot $a$, which holes are threaded, one with a right-hand thread and the other with a left-hand.

D is a right and left screw, with a channel, $f$, made in it, dividing the two threads, which is passed through the blade and engages the jaws. In entering it the screw is passed through the hole $b$ until the channel reaches the slot, when it readily slips down in the slot, and thus remains in that position; and when it is entered in jaws, as in Fig. 1, and is turned it throws the jaws from the blade, or draws them to it, as may be required.

In putting the parts together it may be necessary to enter the screw into the blade and jaws, so as to get them in the right position, and then put the head $g$ on afterward.

In using the implement the blade is inserted in the slot of the screw and the jaws brought up to the edge of the head until they clamp it, and thus prevent the blade from slipping from its place, as shown in Fig. 1.

Having thus described my invention, I claim as new and desire to secure by Letters Patent—

As an improvement in screw-drivers, the jaws C C, having their ends $d\ d$ held in the sockets $e\ e$ in the handle, on either side of the blade, in combination with the blade B, provided with the slot $a$, and the right-and-left screw D, provided with the channel $f$, for insertion in the slot $a$, whereby the jaws can be moved to and from the blade to adapt them to clasp the heads of the screws, substantially as described.

WARREN H. GUTHRIE.

Witnesses:
JOHN BIGGOTT,
JAMES MCGREEVY.